Jan. 17, 1928.
W. A. WUMMEL
WINDSHIELD
Filed Oct. 13, 1924
2 Sheets-Sheet 1
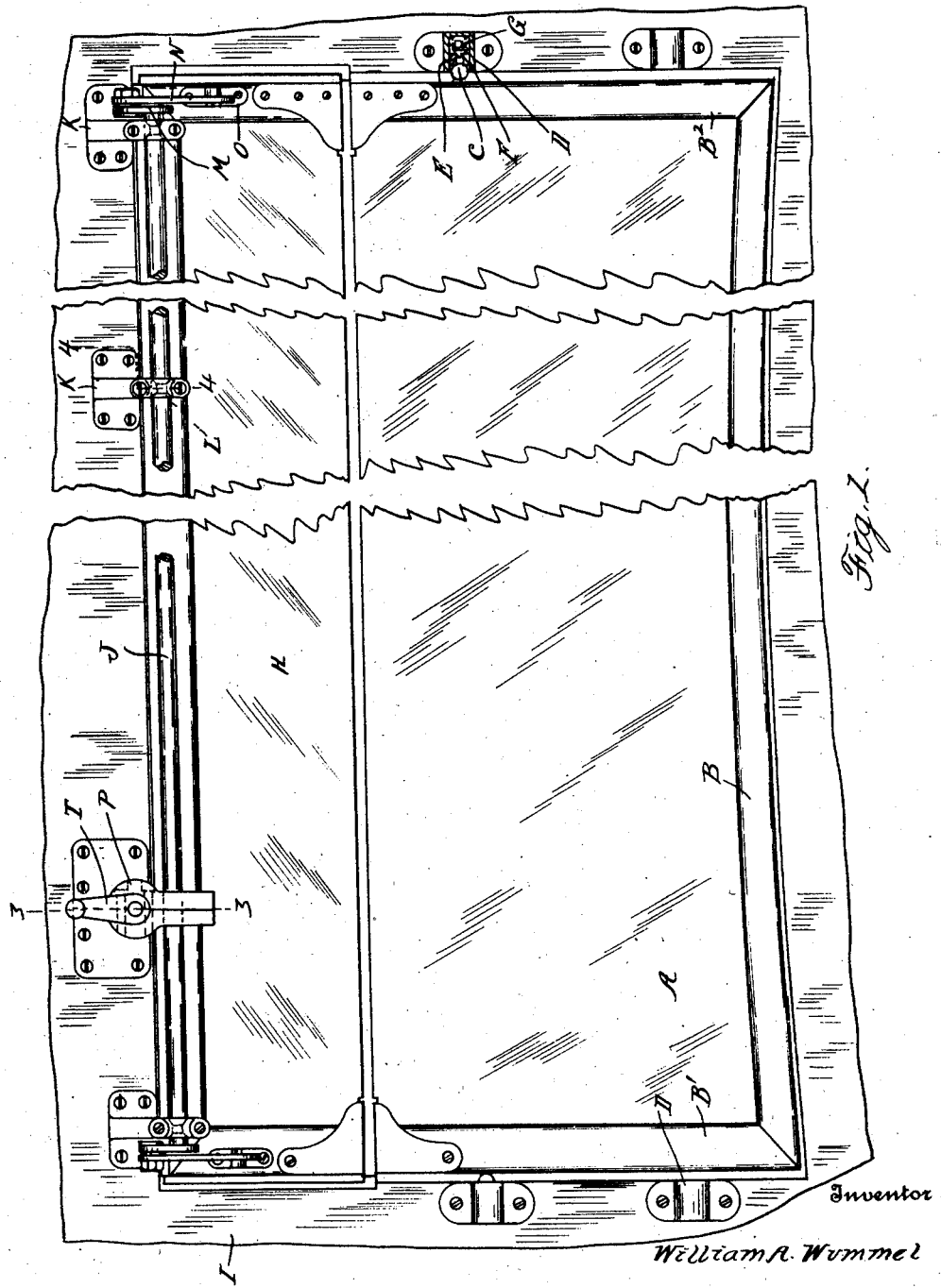

Jan. 17, 1928. 1,656,257
W. A. WUMMEL
WINDSHIELD
Filed Oct. 13, 1924 2 Sheets-Sheet 2
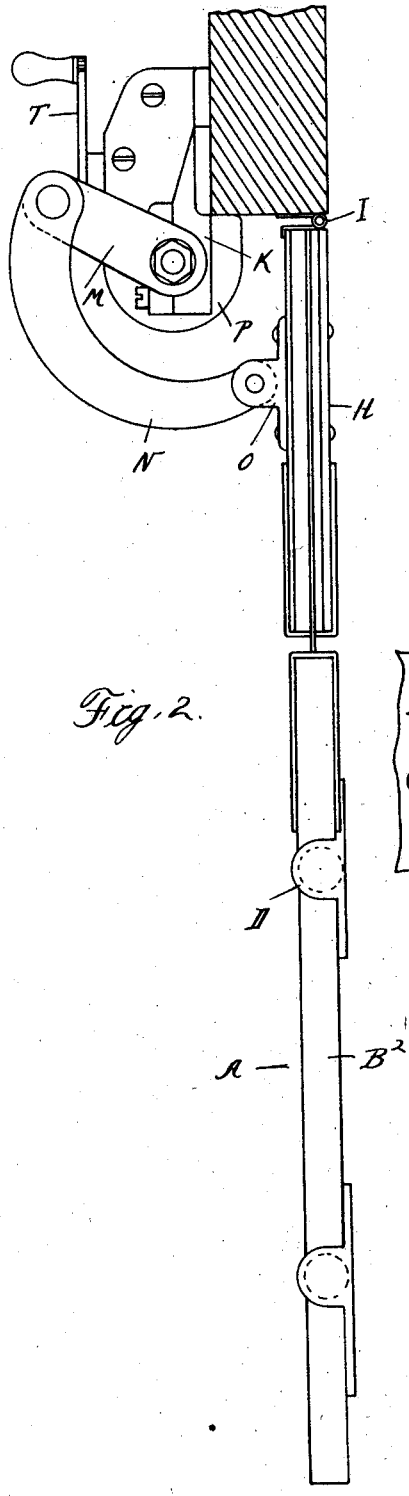
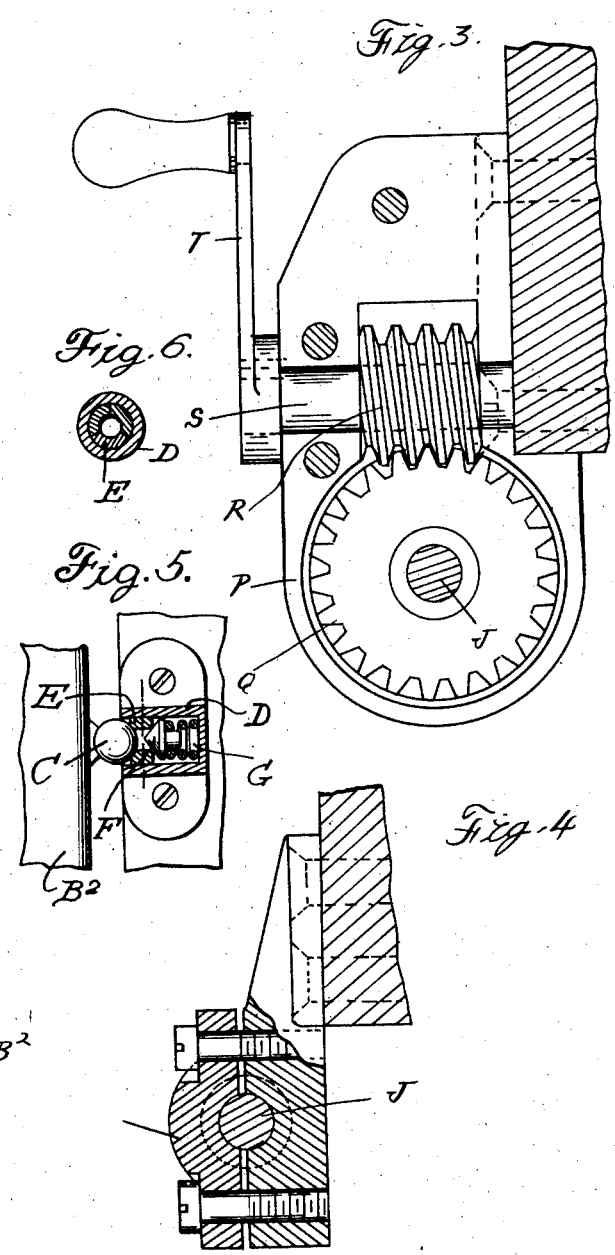
Inventor
William A. Wummel Patented Jan. 17, 1928.

1,656,257

UNITED STATES PATENT OFFICE.

WILLIAM A. WUMMEL, OF DETROIT, MICHIGAN, ASSIGNOR TO MOTOR PRODUCTS CORPORATION, OF DETROIT, MICHIGAN, A CORPORATION OF NEW YORK.

WINDSHIELD.

Application filed October 13, 1924. Serial No. 743,481.

The invention relates to windshields for motor vehicles and has more particular reference to constructions used upon wide bodied vehicles, such as motor buses. It is the object of the invention to obtain a construction which may be readily adjusted by the chauffeur without changing his position and one in which the glass is relieved from torsional stresses which might otherwise fracture the same. To this end the invention consists in the construction as hereinafter set forth.

In the drawings:

Figure 1 is a front elevation partly in section of the windshield;

Figure 2 is a side elevation thereof;

Figures 3 and 4 are, respectively, sections on lines 3—3 and 4—4 of Figure 1.

Figure 5 is a detail view partly in section showing the pivotal connection between the windshield frame and support therefor.

Figure 6 is a sectional view taken on the line 6—6 of Figure 5.

In the present state of the art the bodies of motor buses and other vehicles of the type are greatly extended in width over that of the ordinary automobile. As a consequence, where windshields are employed, they cannot be adjusted in the usual way. Furthermore, to protect such shields from fracture, they must be so mounted as to be relieved from torsional stresses incident to the weaving of the body. With my improved construction the windshield frame is so supported that distortions of the body will not be transmitted thereto; also provision is made by which the tilting section of the frame may be easily adjusted.

In detail, A is the lower section of the windshield, which consists of a plate glass mounted in a channel frame B extending about three sides thereof. The end bars B' and B² of this frame are provided with a plurality of projecting studs C preferably of spherical form, which studs loosely fit in sockets D of bracket members secured to the body. Within the sockets D are arranged the slidable bearing blocks E, which are severed into a plurality of segments, together fitting the spherical studs C. The opposite sides of these bearing blocks are formed with a conical recess for engaging a conical pin F yieldably pressed outward by a coil spring G. The construction is such that normally the bearing blocks E will closely fit the studs C and will be held by the tension of the spring G from rattling. If, however, there is a weaving of the frame, which might displace one or more of the sockets D, such movement will not distort the windshield frame or be transmitted to the studs C. Instead the bearings E will be displaced by compressing the springs G so that the socket D may move into eccentric relation to the studs C. At the same time, the tension of the spring is still exerted so that the windshield frame is supported without loose or rattling parts.

The upper section H of the windshield is also provided with a channel frame extending about the top and sides thereof and the top portion is hinged to the stationary frame, as indicated at I. To swing this frame to different positions of adjustment, I have provided the following construction: J is a rod or shaft extending the full length of the windshield and journaled at a plurality of points, preferably at opposite ends and at its center, in bracket bearings K. These bearings K are formed in two parts to embrace the rod and engage V-shaped grooves L therein. The rod extends beyond the end bearings K and has a threaded shouldered portion which is secured to rock arms M. These are connected by arc-shaped links N to pivot bearings O on the side bars of the windshield frame. P is a bracket housing for holding a worm gear Q and worm R in intermeshing relation to each other. This housing is secured to the stationary frame of the vehicle at a point adjacent to the chauffeur's seat and in such position that the rod J will pass through the worm gear to which it is keyed. There is also provided a crank shaft S secured to the worm R and having a crank handle T by means of which the worm may be revolved.

With the construction as described the worm and worm wheel form a step-down gearing by which rotation of the crank P is slowly transmitted to the rod or shaft J. This will rock the arms M which, through the links N, will act equally upon opposite ends of the windshield frame H, tilting the same to the desired angle. As the gearing is non-reversible, the windshield will stand in any position of adjustment and by reason of the step-down ratio, little effort is required on the part of the operator.

What I claim as my invention is:

1. The combination with a windshield frame, of a stud projecting from said frame having a spherical end portion, a bracket support having a socket having a clearance engagement with said stud, a bearing within said socket for engaging the spherical end of the stud and resilient means for pressing said bearing in contact with said stud.

2. The combination with a windshield frame, of a stud projecting from said frame having a spherical end portion, a bracket support provided with a socket having a clearance engagement with said stud, a spherical socket bearing formed of a plurality of segments fitting within said socket member and engaging the spherical end of said stud, and resilient means for pressing said socket segments into contact with said stud.

3. The combination with a windshield frame, of a stud projecting from said frame and having a spherical end portion, a supporting bracket having a socket portion for receiving said stud with a clearance, complementary segmental spherical socket bearings arranged within the socket portion of said bracket, and a spring for yieldably pressing said segmental socket bearings in contact with said stud.

4. The combination with a windshield frame, of a plurality of studs projecting from the same side of said frame, each having a spherical end portion, a supporting bracket for each stud having a socket portion for engaging said stud with the clearance, split socket bearings within the socket portion of said bracket for engaging the spherical head of said stud, and resilient means for yieldably pressing said split bearings in contact with said studs.

5. The combination with a windshield frame, of a stud projecting from said frame having an enlarged end portion, a bracket support for said frame having a socket loosely engaging said stud, a bearing within said socket having a recess in one end fitting said stud and having a conical recess in the opposite end, and a spring influenced pin having a conical end portion engageable in the conical recess aforesaid for pressing said bearing into engagement with said stud.

6. The combination with a windshield frame, of a stud projecting from said frame having a spherical end portion, a bracket support provided with a socket having a clearance with said stud, a socket bearing formed of a plurality of segments slidably positioned within said socket member and engaging the spherical end of said stud, and a spring pressed pin engageable with the opposite end of said bearing for pressing the same into contact with said stud.

In testimony whereof I affix my signature.

WILLIAM A. WUMMEL.